Patented May 8, 1945

2,375,531

UNITED STATES PATENT OFFICE 2,375,531

COMPOSITION OF MATTER AND METHOD OF MAKING SAME

Melvin De Groote, University City, Bernhard Keiser, Webster Groves, and Arthur F. Wirtel, Kirkwood, Mo., assignors to Petrolite Corporation, Ltd., Wilmington, Del., a corporation of Delaware No Drawing. Application June 21, 1943,
Serial No. 491,733

4 Claims. (Cl. 260—405)

This invention relates to a new composition of matter, our present application being a continuation-in-part of our pending application Serial No. 440,751, filed April 27, 1942.

One object of our invention is to provide a new chemical product or compound that is particularly adapted for use as a demulsifier in the resolution of crude oil emulsions.

Another object of our invention is to provide a practicable method for manufacturing said new chemical product or compound.

Although one of the primary objects of our invention is to provide a new compound or composition of matter that is an efficient demulsifier for crude oil emulsions of the water-in-oil type, the said compound or composition of matter is adapted for use in other arts, as hereinafter indicated. It also may have additional uses in various other fields which have not yet been investigated.

The composition of matter herein described, particularly when it is intended to be used as a demulsifier for petroleum emulsions of the water-in-oil type, is obtained by the hydroxyacetylation of a drastically-oxidized dehydrated ricinoleic acid compound of the kind hereinafter described, particularly a drastically-oxidized dehydrated castor oil.

The expression "ricinoleic acid compounds" is intended to refer to ricinoleic acid, polyricinoleic acid, and particularly, the glycerides of ricinoleic acid. Specifically, the expression includes monoricinolein, diricinolein, ricinoleic acid, etc. Castor oil of commerce contains approximately 85–90% of triricinolein, and due to its availability and low cost, is the preferred raw material.

It is well known that ricinoleic compounds which have not been subjected to pyrolytic dehydration, may be oxidized in various manners. This is usually accomplished by subjecting a ricinoleic compound to treatment, such as, blowing with a suitable gaseous oxidizing medium, i. e., air, oxygen, ozone, or ozonized air. Such oxidation is commonly carried out at ordinary or super-atmospheric pressure (up to about 200 pounds per square inch) either moist or dry; and in the presence of or absence of a catalyst, such as lead oleate, cobalt linoleate, or manganese oleate, or such as alpha-pinene or linseed oil, etc. Care should be taken, however, not to permit temperature rise such that excessive pyrolytic decomposition would take place. The oxidation may be vigorous, as by vigorous blowing, or may be more gradual, as by exposure in thin films to air, provided the oxidation is sufficiently prolonged to obtain the desired drastic oxidation. Usually, the time required is at least about 8 to 10 hours under conditions most favorable to oxidation, i. e., blowing at a relatively high temperature, and for certain fatty compounds much more prolonged oxidation, i. e., several days, or even weeks, is desirable, especially under conditions less favorable to rapid oxidation. In any event, whether the oxidation is produced by continued mild oxidation, or by more vigorous oxidation, a condition of drastic oxidation is indicated by changes in chemical and physical attributes of the material. These changes are usually indicated by a lowered iodine value, an increased saponification value, usually an increased acetyl value, an increased specific gravity, and an increased refractive index. Thus, the iodine number may become less than 70, and even as low as about 40. The saponification value may be about 215 to about 283, and the acetyl value may be about 160 to about 200. The viscosity is increased and the drastically-oxidized product may become very heavy and stiff at ordinary temperatures. The refractive index is also increased. The color of the drastically-oxidized material may be a pale yellow or light amber, or may be a deep orange color. If oxidation is carried on long enough a product of liver-like consistency and dark color is obtained.

The same sort of procedure which is used to oxidize ricinoleic acid compounds which have not been subjected to pyrolytic dehydration, such as ordinary castor oil of commerce, may also be employed to oxidize dehydrated castor oil, or similar material of the kind herein intended as a primary raw material. Generally speaking, however, the following modifications should be kept in mind:

Such materials are apt to contain at least a significant amount of octadecadiene 9,11-acid-1 or its ester, which is recognized as a powerful catalyst for promoting oxidation of castor oil or similar materials. Thus, it is rarely necessary to add any catalyst to hasten oxidation. Furthermore, it is rarely necessary to oxidize under pressure, although such procedure may be employed. It is rarely necessary to use oxygen instead of air. It is rarely necessary to oxidize at a temperature above 120° C. Thus, notwithstanding the fact that any of the usual procedures employed for oxidizing castor oil may be employed for oxidizing dehydrated castor oil, yet generally speaking, considerably less drastic conditions are required. Furthermore, the time element can be decreased greatly. The same sort of apparatus and the same sort of procedure is employed as in the case of conventional oxidation of castor oil. Since dehydrated castor oil is already polymerized to a greater or lesser degree, and perhaps has initial viscosity considerably greater than that of castor oil, it is obvious that the final stages of oxidation must be carried out more cautiously, and that excessive oxidation may produce a solid or spongy or rubber-like material without previous indication of the imminent critical stage. In any event, the material, prior to oxidation, should be analyzed and oxidation should be conducted until there is a significant change, as indicated by increase in viscosity, change in such indices as iodine number, hydroxyl number, etc., all of which is obvious to those skilled in the art. As a matter of fact, unless one desires to do so, there is no need to oxidize such dehydrated castor oil, insofar that various products of this kind are sold commercially and used in other arts which have no particular connection with the usage herein contemplated.

Castor oil or similar materials of the kind described have been dehydrated, and such dehydrated materials used for various other purposes, for instance, as substitutes for drying oils, as plasticizers in the manufacture of resins, as ingredients entering into the compounding of insulating materials, etc. Generally speaking, the conventional procedure is to subject a quantity of castor oil to destructive distillation, approximately 250°–310° C., and generally, 250°–285° C., until at least 5–15% of the original volume has been removed as a distillate. Sometimes the procedure is conducted primarily to recover the distillate, due to its high content of heptaldehyde. Generally speaking, the lower limits of the material distilled off are approximately 8–10%, and the upper limits, possibly 15–23%. In some instances, pyrolysis is conducted in presence of an added catalyst, which may permit the reaction, i. e., the degradation or destructive distillation, to take place at lower temperature; and sometimes vacuum is employed, or both vacuum and a catalyst. Such procedure of subjecting a ricinoleic acid compound, and especially ricinoleic acid or castor oil, to pyrolysis, is so well known that no further elaboration is required. However, for convenience, reference is made to the following patents, which clearly describe the procedure, and in some instances, point out at least some of the complicated chemical changes that take place: U. S. Patents Nos. 1,240,565, Harris, Sept. 18, 1917; 1,749,463, Bertsch, Mar. 4, 1930; 1,799,420, Holton, Apr. 7, 1931; 1,886,538, Fanto, Nov. 8, 1932; 1,892,-258, Ufer, Dec. 27, 1932; 2,156,737, Priester, May 2, 1939; and 2,195,225, Priester, Mar. 26, 1940; and British Patent No. 306,452, Scheiber, May 9, 1930.

As to a comparative evaluation of various dehydration catalysts for castor oil, see Masloboino—Zhirovanya Prom. 16 No. 5/6, 33–8 (1940).

The products which we prefer to use as reactants in the present instance, are blown dehydrated castor oils having substantially the following identifying characteristics within the ranges indicated:

| | |
|---|---|
| Acid number | 14.0 to 25.0 |
| Saponification number | 195 to 240 |
| Iodine number | 70 to 95 |
| Hydroxyl number | 63.0 to 80.0 |
| Reichert-Meisel number | Less than 5 |
| Acetyl number | 60 to 75 |
| Percent unsaponifiable matter | Generally less than 3% |
| Percent nitrogen | 0.0% |
| Percent $SO_2$ | 0.0% |
| Percent ash | Trace |
| Specific gravity at 31° C | About 0.9574 |
| Refractive index at 31° C | About 1.495 |
| Color | Straw or light amber |

A specific example of a very desirable oxidized dehydrated castor oil for use in the practice of this invention and which is available in the open market, has approximately the following specific characteristics:

| | |
|---|---|
| Acid number | 18.1 |
| Saponification number | 216.5 |
| Iodine number | 83 |
| Acetyl number | 68 |
| Hydroxyl number | 71.4 |
| Reichert-Meisel number | 2.0 |
| Percent unsaponifiable matter | Less than 2.5% |
| Percent nitrogen | 0.0 |
| Percent $SO_2$ | 0.0 |
| Percent ash | Trace |
| Specific gravity at 31° C | 0.9574 |
| Refractive index at 31° C | 1.4795 |

The above values or similar values are of assistance in indicating and characterizing a material of the kind herein contemplated. For instance, although the entire chemistry of the dehydration of castor oil is not known, yet obviously, there must be a marked reduction in the acetyl or hydroxyl value, and simultaneously an increase in the iodine value. Also, such pyrolytic reaction tends to eliminate the low molal or volatile acids. On oxidation of such material, the acetyl value or hydroxyl value may stay constant or increase. But, in any event, the iodine value is reduced until it begins to approximate that of castor oil or ricinoleic acid prior to dehydration, or somewhat lower. The fact that the acetyl value or hydroxyl value does not increase proportionally with the drop in the iodine value is, of course, due to either the formation of ether type compounds, or oxides which do not give a hydroxyl or acetyl value, or else, due to the formation of ester acids or similar reactions. It is generally desirable that the iodine number of the drastically-oxidized dehydrated castor oil be not less than 70, that the saponification value be within the range 195 to 200 and that the acetyl value be within the range of 60 to 75.

The production of hydroxyacetylated drastically-oxidized dehydrated castor oil, or a similar type of compound, is comparatively simple and is comparable to the manufacture of acetylated castor oil, except that hydroxyacetic acid appears to be more reactive than acetic acid, and instead of using castor oil, one employs drastically-oxidized dehydrated castor oil as a reactant. Since drastically-oxidized dehydrated castor oil is characterized by the presence of a hydroxyl group or groups, as indicated by the hydroxyl value or number, it is obvious that esterification must take place, and thus the reactant is conducted in such a manner and under such conditions as to promote esterification and remove any water formed. The usual procedures for promotion of esterification are well known, and involve one or more of the following: Employment of a temperature high enough to eliminate any water formed, for instance, 120–180° C.; sometimes the presence of a strong acid, such as a benzene-sulfonic acid in small amounts acts as a catalyst; sometimes it is expedient to pass an inert dried gas through the reacting mixture; at other times esterification may be conducted in the presence of a high boiling water-insoluble solvent, such as xylene or the like, which assists in removing the water in the form of vapors; the condensate so derived, both from the water vapor and solvent vapor, is separated by gravity; and the solvent returned to the reacting chamber for further use.

The selection of suitable amounts of reactants in the manufacture of hydroxyacetylated drastically-oxidized dehydrated castor oil or the like, is, of course, simple. One may select a drastically-oxidized dehydrated castor oil corresponding, for example, to the type previously described by analytical values. The hydroxyl or acetyl value or number includes the hydroxyl groups attached to each of the high molal acyl radicals present. The chemical changes occurring in the manufacture of drastically-oxidized dehydrated castor oil indicate that the final product is, in essence, a glyceride, or at least, to the extent of a majority percentage. With this in mind, it is apparent that the hydroxyl groups may be distributed more or less uniformly in regard to the three high molal acyl radicals present in such glyceride. For convenience, in the present instance, one may consider such product as comparable to triricinolein, and as if it were a trihydric alcohol. From triricinolein one can obtain monohydroxyacetylated triricinolein, di-hydroxyacetylated triricinolein, and trihydroxyacetylated triricinolein. Similarly, based on molar proportions, one can obtain a mono-hydroxyacetylated drastically-oxidized dehydrated triricinolein, a di-hydroxyacetylated drastically-oxidized dehydrated triricinolein, and a tri-hydroxyacetylated drastically-oxidized dehydrated triricinolein. For practical purposes, of course, there is no economical justification for obtaining a technically pure triricinolein, subjecting such material to dehydration, and then to drastic oxidation, and finally to hydroxyacetylation. For practical purposes, we prefer to use castor oil as the initial raw material. Actually, one is not limited to stoichiometric proportions, for we have found that a moderate excess of hydroxyacetic acid may be employed, over and above the amount indicated by the acetyl number or value.

Thus, the product particularly contemplated in the present instance, is the compound or compounds obtained by the hydroxyacetylation of drastically-oxidized dehydrated castor oil. For purposes of convenience, reference will be made to mono-hydroxyacetylated drastically-oxidized dehydrated castor oil, di-hydroxyacetylated drastically-oxidized dehydrated castor oil, and tri-hydroxyacetylated drastically-oxidized dehydrated castor oil. Examination of the reaction indicates that water is formed and must be removed. Actually, the water formed may not necessarily be removed instantly, and thus, may undergo certain other obvious reactions. Likewise, for reasons of economy, it may be desirable to use a highly concentrated hydroxyacetic acid instead of the anhydrous material as the selected reactant. In such instances, the water would readily enter into hydrolytic reactions with the drastically-oxidized dehydrated castor oil, and thus, the product or composition which is actually hydroxyacetylated may include the estolides, and also lower-glycerides of the drastically-oxidized dehydrated castor oil. Glycerol may also be present, but it is not intended in the present instance to claim the product obtained or reaction between hydroxyacetic acid and glycerol, but it is to be noted that such material may be present cogenerically, for reasons indicated.

The lower glycerides are comparable to mono-olein or di-olein, and are referred to generally as superglycerinated fats, or more specifically, superglycerinated triricinolein, or superglycerinated castor oil. In the present instance, the proper nomenclature would be superglycerinated drastically-oxidized dehydrated castor oil. Actually, if one desired, such products or compounds need not be obtained by hydrolysis, but one could treat one mole of drastically-oxidized dehydrated castor oil with one or two moles of glycerol in the customary manner, so as to cause rearrangement to take place, i. e., so as to obtain the lower glycerides.

Earlier reference to the compounds herein contemplated, and particularly for use as a demulsifier, included the hydroxyacetylated derivatives of drastically-oxidized dehydrated ricinoleic acid compounds. In view of what has been said, such compounds are now suitably limited to drastically-oxidized dehydrated castor oil, drastically-oxidized dehydrated triricinolein, drastically-oxidized dehydrated diricinolein, drastically-oxidized dehydrated mono-olein, and the estolides of drastically-oxidized dehydrated castor oil, together with drastically-oxidized dehydrated ricinoleic acid and polyricinoleic acid.

Although it is believed that in view of what has been said, that no further description is necessary in regard to the manufacture of hydroxyacetylated drastically-oxidized dehydrated castor oil, or similar compounds, the following examples are included by way of illustration:

HYDROXYACETYLATED DRASTICALLY-OXIDIZED DEHYDRATED CASTOR OIL

*Example 1*

1,000 pounds of drastically-oxidized dehydrated castor oil, comparable in chemical characteristics to the tabular specification appearing previously, is treated with 37 pounds of concentrated hydroxyacetic acid containing 30% of water. The selected amount is sufficient to combine with one-third of the available hydroxyl radicals, as indicated by the acetyl value or number. The reaction is conducted at 200–250° C. for approximately 1 hour. Completeness in reaction is indicated by the fact that elimination of water practically ceases, decrease in acid value and hydroxyl value of mixture, and elimination of free hydroxyacetic acid. The procedure is conducted in the usual reaction vessel of the kind employed for esterification, and may be constructed of any material which is resistant to the reactants. The amount of hydroxyacetic acid selected in the present instance is calculated so as to give substantially a mono-hydroxylated blown dehydrated castor oil.

HYDROXYACETYLATED DRASTICALLY-OXIDIZED DEHYDRATED CASTOR OIL

*Example 2*

The same procedure is employed as in Example 1, preceding, except that twice the amount of hydroxyacetic acid is employed so as to obtain a dihydroxyacetylated blown dehydrated castor oil.

HYDROXYACETYLATED DRASTICALLY-OXIDIZED DEHYDRATED CASTOR OIL

*Example 3*

The same procedure is followed as in Example 1, preceding, except that three times the amount of hydroxyacetylated castor oil is employed so as to yield substantially a tri-hydroxyacetylated blown dehydrated castor oil.

HYDROXYACETYLATED DRASTICALLY-OXIDIZED DEHYDRATED CASTOR OIL

Example 4

The same procedure is followed as in Examples 1 to 3, preceding, except that anhydrous hydroxyacetic acid is employed and water is removed immediately upon formation. The product so obtained represents hydroxyacetylated blown dehydrated castor oil, or more especially, hydroxyacetylated blown dehydrated triricinolein, in the presence of a minimum amount of hydroxyacetylated cogeners.

HYDROXYACETYLATED DRASTICALLY-OXIDIZED DEHYDRATED CASTOR OIL

Example 5

The same procedure is followed as in Examples 1 to 4, preceding, but instead of using the stoichiometric amount of hydroxyacetic acid to yield a completely hydroxyacetylated product, one employs an excess, for instance, a 10–20% excess of hydroxyacetic acid.

Nothing that has been said previously is intended to suggest that one cannot use chemically pure or technically pure triricinolein as an initial raw material instead of castor oil. Furthermore, one may obtain or prepare diricinolein, either pure or of a technical purity, and such material may be employed as an initial raw material. Likewise, pure or technically pure monoricinolein or ricinoleic acid may be employed. For obvious reasons, however, nothing is ordinarily gained by using any initial raw material other than castor oil, and we have found castor oil to yield much more effective demulsifiers than the other materials referred to. Thus, our preference, by far, is to employ castor oil as the initial raw material, and to subject it to drastic oxidation and dehydration.

In view of what has been said, it is obvious that in the hereto appended claims there cannot be any satisfactory means of characterizing the products as such, or for use as demulsifiers, except in terminology, which is related to the method of manufacture.

The expression "drastically-oxidized" or "drastic oxidation," as employed in the hereto appended claims, refers to gaseous oxidation by means of an oxygen-containing medium. Such expression does not contemplate wet oxidation, or oxidation by means of permanganate, or other comparable oxidizing agents.

It is furthermore understood that hydroxyacetylation can be conducted by means of the chemical equivalent of hydroxyacetic acid, as well as the acid itself, for example, the anhydride or acyl chloride.

Previous reference has been made to mono-hydroxyacetylated drastically-oxidized dehydrated castor oil, di-hydroxyacetylated drastically-oxidized dehydrated castor oil, etc. It is believed that the meaning of these expressions is perfectly clear. For instance, it has been pointed out that drastically-oxidized dehydrated castor oil may have an acetyl number or value of 75. This value may be considered as being distributed over 3 acyl radicals, or to state it another way, as being an acetyl value of 25 per acyl group. Thus, the preparation of a monohydroxyacetylated product would involve sufficient reactant so as to convert one-third of the acetyl value or number, to wit, 25. A di-hydroxyacetylated product would involve sufficient reactant to convert two-thirds or the equivalent of an acetyl value of 75. A tri-hydroxyacetylated product would involve sufficient reactant to eliminate the entire acetyl value of 75.

The herein described chemical compounds or products are of distinct value as a break inducer in the doctor treatment of gasoline or the like, as described in U. S. Patent No. 2,157,223, to Sutton, dated May 9, 1939. Other additional uses include application as plasticizers, in plastics, synthetic resins, etc., and particularly in the acetate type, i. e., the cellulose acetate, vinyl acetate, and similar types.

Having thus described our invention, what we claim as new and desire to secure by Letters Patent is:

1. A hydroxyacetylated drastically-oxidized dehydrated ricinoleic acid compound selected from the class consisting of drastically-oxidized dehydrated castor oil, drastically-oxidized dehydrated triricinolein, drastically-oxidized dehydrated diricinolein, drastically-oxidized monoricinolein, drastically-oxidized dehydrated ricinoleic acid, drastically-oxidized dehydrated polyricinoleic acid, and the estolides of drastically-oxidized dehydrated castor oil.

2. A hydroxyacetylated drastically-oxidized dehydrated castor oil.

3. A tri-hydroxyacetylated drastically-oxidized dehydrated castor oil.

4. In the manufacture of the compound described in claim 1, the step of hydroxyacetylating a drastically-oxidized dehydrated ricinoleic acid compound selected from the class consisting of drastically-oxidized dehydrated castor oil, drastically-oxidized dehydrated triricinolein, drastically-oxidized dehydrated diricinolein, drastically-oxidized dehydrated monoricinolein, drastically-oxidized dehydrated ricinoleic acid, drastically-oxidized dehydrated polyricinoleic acid, and the estolides of drastically-oxidized dehydrated castor oil.

MELVIN DE GROOTE.
BERNHARD KEISER.
ARTHUR F. WIRTEL.